Jan. 31, 1939.  H. V. WODTKE  2,145,705
CUSHION CAP FOR INSULATED CABLES
Filed Oct. 16, 1936
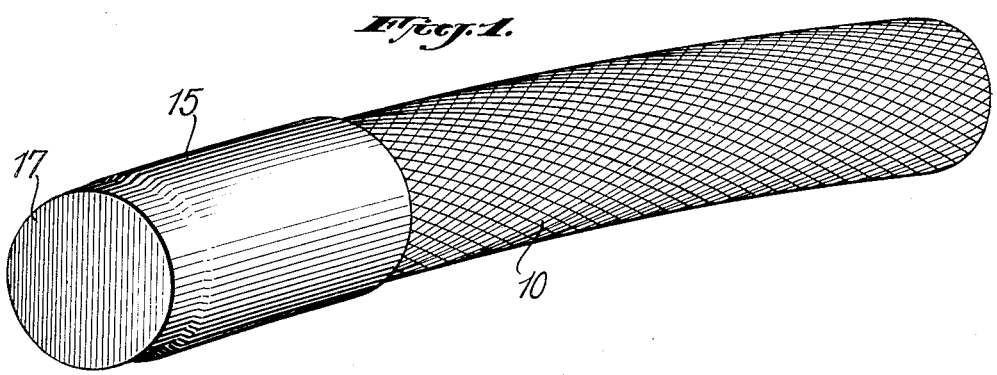
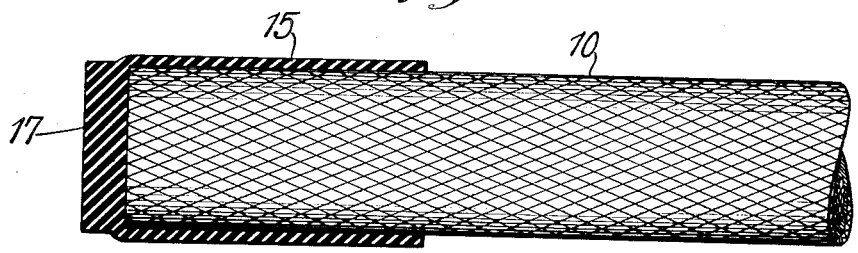
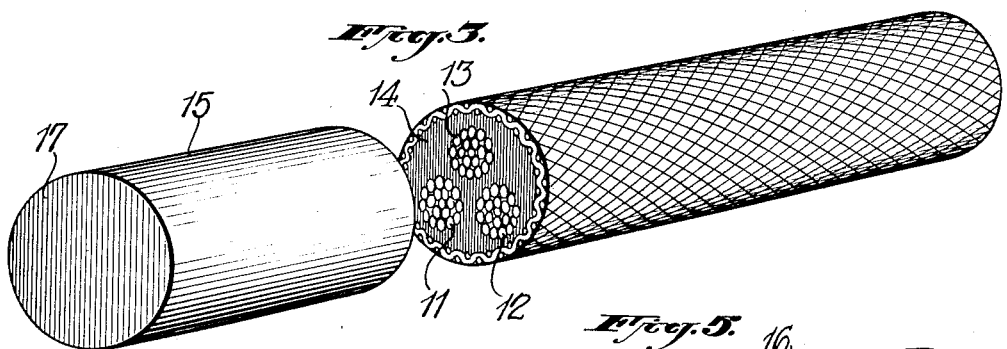
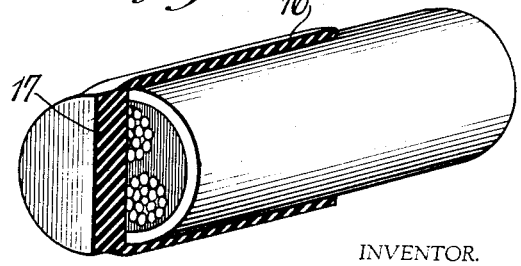
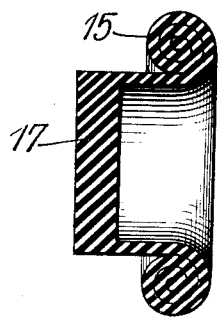
INVENTOR.
HANS V. WODTKE.
BY
ATTORNEYS

UNITED STATES PATENT OFFICE 2,145,705

CUSHION CAP FOR INSULATED CABLES

Hans V. Wodtke, Marion, Ind., assignor to Anaconda Wire & Cable Company, New York, N. Y., a corporation of Delaware Application October 16, 1936, Serial No. 105,865

1 Claim. (Cl. 173—264)

This invention relates to caps for insulated cables made of resilient material and adapted to be tensioned over a cable end, so as to prevent the infiltration of water or moisture to the interior of the cable. A characteristic feature of the improved cap is that it is provided with a thickened resilient body at its end wall to serve as a cushion and also to prevent puncturing.

Large multi-conductor cables are frequently shipped from the factory to the user on large flanged reels with the ends of the cables protruding through the reel flanges. Cables to which the present invention is directed usually include copper strands with voids or ridges between the individual strands, there frequently being a filler of fibrous material around the conductor or between conductors, in the case of multi-strand conductors.

During shipment, such cables are exposed to the elements, and water as well as moisture in a somewhat vaporous condition will creep endwise into the cable and cause future difficulties. This is especially true on shipments on the high seas, or inland waterways, where the humidity is very high. It is also known to those skilled in the art that, before being installed, cables often stand for long periods of time in the open near the job, for instance in stone quarries, or in damp places, such as mines. Under such conditions, unless protective means are provided, moisture will find its way for considerable distances into the interior of the cable. Heretofore, lead sheathed cables have had their ends sealed by the utilization of a metal cap soldered on the end of the sheath. Generally, this cap has been made of lead. When such a metallic capped cable is bent or straightened out, the conductors upon being transformed from the coiled condition of the reel to the straightened position will move endwise with the result that the metal cap will either be punctured or, in some cases, even pushed off. In the case of woven and rubber covered cables, sometimes the ends have been sealed by wrapping on a piece of patching rubber and securing the same in place by friction tape. This primitive or crude practice is not moistureproof and the closure unravels or becomes displaced during transit quite frequently.

To overcome the difficulties of prior practice, I have devised a novel resilient cap, such as shown in the accompanying drawing and hereinafter more fully described.

In the drawing—

Fig. 1 is a perspective view of the end of a length of cable with my improved cap applied thereto; Fig. 2 is an elevation of the end of a length of cable showing a cap thereon in section; Fig. 3 is a perspective view showing the relative proportions of the cap and the cable before assemblage; Fig. 4 illustrates the manner in which the cylindrical wall of the cap is rolled prior to being tensioned over the cable end; Fig. 5 is a perspective view partly in section showing the cylindrical wall of the improved cap tensioned over the cable end.

Referring more particularly to the drawing, 10 represents a cable, which in the case illustrated is of a multi-conductor type having a plurality of stranded conductors 11, 12 and 13 embedded or encased in any conventional form of insulating material, such as indicated at 14. The cable insulation frequently includes fibrous materials or there may be fillers combined in the insulating material, which have the ability of absorbing moisture.

To prevent such absorption of moisture, I provide the improved moisture excluding cap, indicated generally at 15. In its preferred form, this cap comprises a body of rubber having a relatively thin cylindrical side wall 16 and a relatively heavier end wall 17. In applying the cap to the cable end, the thin wall 16 is rolled back or coiled on itself, as illustrated in Fig. 4. In order to enable such coiling of the cylindrical wall, it is advantageous also to have the heavy or thick wall 17 to prevent turning the device inside out. Also, such a heavy end wall provides something which a hand of the user can grip in initially engaging the cap with the cable end. Once the rolled back cap is fitted with its end wall 17 in fairly snug contact with the cable end, the thin side wall portion can be rolled into overlapping relation with the cable to the position shown, for example, in Figs. 2 and 5. Comparison of the cap, as shown in Figs. 2 and 5, with the cap as shown in Fig. 3 will reveal that before assembly the outside diameter of the cap is of about substantially the same as the outside diameter of the cable. Thus, when the cap is finally assembled on the cable end, it is apparent that it will be tensioned thereover, so as to resiliently grip the same and provide a substantially or approximately hermetic seal and thus prevent the infiltration of air, moisture, or water into the cable.

The thickened end wall 17 is of advantage as it serves the dual function of a protective cushion and a non-puncturable resilient wall. Such a resilient cushion wall will permit of limited endwise movement of the conductors occasioned by bending or straightening out the cable upon removal from its storage reel. The invention has been illustrated as applied to a cable having an outer braided or woven covering, but it is to be understood that the improved cap can be applied just as effectively to a rubber covered cable or to conventional forms of lead sheathed cables. The cap will usually be applied at the factory, where the cable is manufactured, but it is also contemplated that the improved cap may be made as a separate article of manufacture to be furnished to users who already have stocks of cable in storage.

While ordinarily the fact that the protective cap is tensioned over the cable end will be sufficient to form an effective seal to prevent the infiltration of moisture, it is contemplated that in some cases the cable ends may be coated with rubber cement or other suitable high grade patching cement, so as to form practically a homogeneous bond between the cable end and the interior of the cap. Regardless of whether the cap is merely tensioned or cemented to the cable, the engagement between the two will be such that endwise movement of the conductors within the sheath will be incapable of either puncturing the thickened end wall or dislodging the cap.

While I have described quite precisely the embodiment of the invention illustrated it is to be understood that such variations as fall within the scope of the appended claim may be made by those skilled in the art without departure from the invention as defined.

What I claim is:—

In combination, a cable comprising a conductor, insulation comprising an absorbing medium surrounding said conductor, a cylindrical sheath enveloping the insulated conductor, said sheath and insulation extending substantially to the end of the conductor and a rubber cap having a relatively thick end wall abutting the ends of said sheath insulation and conductor and a relatively thinner cylindrical side wall extending from said end wall over the outer surface of said sheath and being normally of less internal diameter than the external diameter of said sheath whereby said cylindrical side wall grips the external surface of said sheath and forms a water and air-tight seal therewith.

HANS V. WODTKE.